US007589621B2

(12) United States Patent
Ohno et al.

(10) Patent No.: US 7,589,621 B2

(45) Date of Patent: Sep. 15, 2009

(54) INFORMATION DELIVERY SYSTEM, VEHICLE AND BROADCASTING APPARATUS FOR AN INFORMATION DELIVERY SYSTEM, AND METHOD OF OUTPUTTING RELATED INFORMATION THEREFOR

(75) Inventors: Tsuneo Ohno, Tochigi-ken (JP); Kenichi Mineta, Rancho Palos Verdes, CA (US); Takumi Shimomura, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 11/591,583

(22) Filed: Nov. 2, 2006

(65) Prior Publication Data

US 2007/0109105 A1 May 17, 2007

(30) Foreign Application Priority Data

Nov. 11, 2005 (JP) ............................ 2005-327129

(51) Int. Cl.
*B60Q 1/00* (2006.01)
*H04Q 5/22* (2006.01)

(52) U.S. Cl. .................... 340/457.4; 340/438; 340/439; 340/10.52; 340/426.13; 340/426.36; 701/32

(58) Field of Classification Search ............. 340/457.4, 340/438, 439; 701/30
See application file for complete search history.

(56) References Cited

U.S. PATENT DOCUMENTS

| | | | | |
|---|---|---|---|---|
| 5,113,182 | A * | 5/1992 | Suman et al. | 340/5.28 |
| 5,442,553 | A * | 8/1995 | Parrillo | 455/420 |
| 5,886,647 | A * | 3/1999 | Badger et al. | 340/825.69 |
| 6,028,537 | A * | 2/2000 | Suman et al. | 340/988 |
| 6,317,668 | B1 * | 11/2001 | Thibault | 701/35 |
| 6,330,449 | B1 * | 12/2001 | Kim | 455/442 |
| 6,615,381 | B1 | 9/2003 | Fukuda et al. | |
| 2002/0044049 | A1 * | 4/2002 | Saito et al. | 340/438 |
| 2002/0103582 | A1 * | 8/2002 | Ohmura et al. | 701/33 |
| 2005/0132024 | A1 | 6/2005 | Habaguchi et al. | |
| 2005/0138025 | A1 | 6/2005 | Yamada et al. | |

FOREIGN PATENT DOCUMENTS

| | | | |
|---|---|---|---|
| JP | 11-355854 | A | 12/1999 |
| JP | 2000-115825 | A | 4/2000 |
| JP | 2002-109690 | A | 4/2002 |
| JP | 2002-334168 | A | 11/2002 |
| JP | 2005-181219 | A | 7/2005 |
| JP | 2007-531927 | A | 11/2007 |

* cited by examiner

*Primary Examiner*—Donnie L Crosland
(74) *Attorney, Agent, or Firm*—Arent Fox LLP

(57) ABSTRACT

A comparator is supplied with a hold visit code and a visit guidance message, which are received by a receiver from a broadcasting device via radio waves. Alternatively, the comparator is supplied with a hold visit code and a visit guidance message, which are received by a communicating unit from a server through a public circuit network, a wireless link, a cellular phone unit, and another wireless link. The comparator then compares the supplied HVC with an HVC that is stored in a message table in a storage unit. If the HVCs compared by the comparator agree with each other, then an information output unit resets the HVC stored in the message table, and outputs the visit guidance message to an output unit.

19 Claims, 8 Drawing Sheets

FIG. 3A

MESSAGE TABLE

| DTC | MESSAGE | HVC |
|---|---|---|
| P0300 | AIR CONDITIONER TEMPERATURE SENSOR HAS FAILED. WAIT AWHILE UNTIL WE LET YOU KNOW THAT A REPAIR PRODUCT HAS BEEN PREPARED. | 0 |
| P0301 | MOTOR-DRIVEN DOOR MIRROR CANNOT BE PROPERLY STORED. WAIT AWHILE UNTIL WE LET YOU KNOW THAT A REPAIR PRODUCT HAS BEEN PREPARED. | 0 |
| ⋮ | ⋮ | ⋮ |

FIG. 3B

MESSAGE TABLE

| DTC | MESSAGE | HVC |
|---|---|---|
| P0300 | AIR CONDITIONER TEMPERATURE SENSOR HAS FAILED. WAIT AWHILE UNTIL WE LET YOU KNOW THAT A REPAIR PRODUCT HAS BEEN PREPARED. | 0 |
| P0301 | MOTOR-DRIVEN DOOR MIRROR CANNOT BE PROPERLY STORED. WAIT AWHILE UNTIL WE LET YOU KNOW THAT A REPAIR PRODUCT HAS BEEN PREPARED. | 101 |
| ⋮ | ⋮ | ⋮ |

FIG. 4A

REFERENCE TABLE

| DTC | HVC |
|---|---|
| P0300 | 100 |
| P0301 | 101 |
| ⋮ | ⋮ |

FIG. 4B

MESSAGE TABLE

| DTC | MESSAGE | HVC |
|---|---|---|
| P0300 | AIR CONDITIONER TEMPERATURE SENSOR HAS FAILED. WAIT AWHILE UNTIL WE LET YOU KNOW THAT A REPAIR PRODUCT HAS BEEN PREPARED. | 100 |
| P0301 | MOTOR-DRIVEN DOOR MIRROR CANNOT BE PROPERLY STORED. WAIT AWHILE UNTIL WE LET YOU KNOW THAT A REPAIR PRODUCT HAS BEEN PREPARED. | 0 |
| ⋮ | ⋮ | ⋮ |

INFORMATION DELIVERY SYSTEM, VEHICLE AND BROADCASTING APPARATUS FOR AN INFORMATION DELIVERY SYSTEM, AND METHOD OF OUTPUTTING RELATED INFORMATION THEREFOR

BACKGROUND OF THE INVENTION

1. Field of the Invention

The present invention relates to a broadcasting apparatus, a vehicle for acquiring information distributed by a broadcast from the broadcasting apparatus, an information delivery system including the broadcasting apparatus and the vehicle, and a method of outputting related information therefore.

2. Description of the Related Art

Recently, increased attention has been drawn to remote maintenance technology, for providing maintenance services from a server to a vehicle through a telephone circuit, in order to quickly and accurately eliminate device failures in the vehicle.

Japanese Laid-Open Patent Publication No. 2002-109690 discloses a remote maintenance apparatus and method. In accordance with the disclosed remote maintenance apparatus and method, a vehicle that is suffering from a device failure sends an ID number and data concerning the device failure through a wireless link to a call center, which operates as a server. The call center identifies the vehicle based on the received ID number, and analyzes the device failure data to determine whether the vehicle requires stopgap measures to be performed or not. If the call center judges that the vehicle requires stopgap measures, then the call center delivers the details of such stopgap measures to the vehicle through the wireless link. If the call center judges that the vehicle needs to be moved to a maintenance shop (repair shop) for repairs, then the call center schedules a repair while sending details of the device failure to the repair shop, and delivers various information items, including information concerning the location of the repair shop, to the vehicle through the wireless link.

According to the disclosure of Japanese Laid-Open Patent Publication No. 2002-109690, as described above, the call center delivers information concerning the details of stopgap measures and various items of information, including information about the location of the repair shop, to the vehicle that suffers from a device failure through the wireless link.

When the call center delivers the above information through wireless links to a plurality of vehicles, even if the vehicles suffer from the same device failure, and the details of the stopgap measures and the location information of the repair shop are represented by the same information, the call center still generates the details concerning the stopgap measures and location information of the repair shop individually for each of the vehicles. As a result, as the call center handles an increased number of vehicles, then the call center is required to handle an increased amount of information, and hence experiences an increased burden in delivering such information to the vehicles.

The repair shop prepares replacement parts that are required to repair the vehicle based on the scheduled repair date and the device failure details, which are sent from the call center. At this time, a vehicle that is suffering from a failure may arrive at the repair shop, based on the location information of the repair shop received from the call center, before the repair shop has prepared the necessary replacement parts. Since the replacement parts have not yet been prepared, the repair shop must request that the occupant (driver) of the vehicle come again to the repair shop when the replacement parts are ready. As a result, the occupant of the vehicle is required to come twice to the repair shop in order to repair the vehicle.

SUMMARY OF THE INVENTION

It is a first object of the present invention to provide an information delivery system, a vehicle, a broadcasting apparatus, and a method of outputting related information, which are effective to reduce the burden when delivering information to the vehicle.

A second object of the present invention is to provide an information delivery system, a vehicle, a broadcasting apparatus, and a method of outputting related information, which are effective to prevent a vehicle and an occupant of the vehicle from coming unnecessarily to the repair shop.

According to the present invention, there is provided an information delivery system comprising a broadcasting apparatus for broadcasting an identification code and related information, and a vehicle for acquiring information delivered by a broadcast from the broadcasting apparatus, the vehicle comprising an identification code storage unit for storing a first identification code, a second identification code acquiring unit for acquiring a second identification code and first related information delivered by a broadcast from the broadcasting apparatus, an identification code comparator for comparing the first identification code and the second identification code with each other, and an information output unit for outputting the first related information if the first identification code and the second identification code, which are compared with each other by the identification code comparator, agree with each other.

According to the present invention, there is also provided a method of outputting related information, comprising the steps of storing a first identification code in an identification code storage unit of a vehicle, acquiring a second identification code and first related information delivered by a broadcast with a second identification code acquiring unit of the vehicle, comparing the first identification code and the second identification code with each other with an identification code comparator, outputting the first related information from an information output unit if the first identification code and the second identification code, which are compared with each other by the identification code comparator, agree with each other.

The information output unit outputs the first related information if the first identification code and the second identification code, which are compared with each other by the identification code comparator, agree with each other. Stated otherwise, the identification code comparator functions as a filter for controlling output of the first related information from the information output unit. As a result, the information output unit on the vehicle can output the first related information only if the vehicle stores the first identification code.

If information, which is to be delivered to each of a plurality of vehicles that store the first identification code, is delivered as the first related information by means of broadcasting to the vehicles, then the information output unit of each of the vehicles within a broadcasting area can output the acquired first related information. As a result, the burden posed when delivering information to the vehicles is reduced, and the first related information can reliably be delivered to the vehicles within the broadcasting area.

The first and second identification codes may be codes common to a plurality of vehicles, which represent types of vehicles, models of vehicles, periods during which the vehicles were manufactured, and other various codes such as IDs (so-called VIN numbers) inherent in vehicles.

The first related information refers to information to be delivered to the vehicle by a broadcast, and includes various types of guidance information, including campaign information and maintenance information, with respect to the vehicle. When these various types of guidance information for the occupant (driver) of the vehicle are delivered as first related information to the vehicle, the vehicle and the occupant thereof can be prevented from coming unnecessarily to a repair shop. Further, if the first related information is delivered via a broadcast, instead of by a written guidance notification, then since a written guidance notification is not required to be sent, costs required for sending such guidance information can be reduced.

The information output unit should preferably delete the first identification code stored in the identification code storage unit if the first identification code and the second identification code, which are compared with each other by the identification code comparator, agree with each other.

Since the first identification code stored in the identification code storage unit is deleted, the information output unit is prevented from outputting the same first related information redundantly.

The vehicle should preferably further comprise a first identification code acquiring unit for acquiring the first identification code and storing the acquired first identification code in the identification code storage unit. Therefore, the identification code storage unit stores only an identification code required for comparison in the identification code comparator.

The first identification code acquiring unit should preferably acquire the first identification code, which is delivered by a broadcast from the broadcasting apparatus. Therefore, the first identification code can be delivered efficiently to the vehicle.

The vehicle should preferably further comprise an identification code input unit for entering the first identification code, wherein the first identification code acquiring unit acquires the first identification code entered by the identification code input unit. Therefore, the first identification code can be acquired appropriately and stored in the identification code storing unit.

Preferably, the vehicle further comprises a device failure detecting means for detecting a device failure of the vehicle and outputting device failure information, and a failure information transmitting unit for transmitting the device failure information to the broadcasting apparatus, whereas the broadcasting apparatus further comprises a failure information receiver for receiving the device failure information transmitted from the failure information transmitting unit, and an identification code transmitting unit for transmitting the first identification code, corresponding to the device failure information received by the failure information receiver, to the vehicle. The first identification code acquiring unit preferably acquires the first identification code, which is transmitted from the identification code transmitting unit.

Preferably, the vehicle further comprises a device failure detecting unit for detecting a device failure of the vehicle and outputting device failure information, and a first identification code generating unit for generating the first identification code when the device failure information is output from the device failure detecting unit. The first identification code acquiring unit preferably stores the first identification code, which is generated by the first identification code generating unit, in the identification code storage unit.

As a consequence, information can be delivered corresponding to the first identification code, without fail to vehicles that are suffering from a device failure.

Preferably, the first identification code acquiring unit acquires both the first identification code and the second related information, and the information output unit outputs the acquired second related information when the acquired first identification code is stored in the identification code storage unit. When the vehicle acquires the first identification code, the vehicle can also acquire necessary information, as second related information, and can output the second related information from the information output unit.

The first related information preferably comprises a visit guidance message, for guiding the vehicle to a repair shop. The second related information preferably comprises a hold visit message, for holding (postponing) the visit of the vehicle to the repair shop.

When a hold visit message is output from the information output unit, the occupant of the vehicle, which is suffering from a device failure, is requested to hold (postpone) the visit to the repair shop. When a visit guidance message is output from the information output unit based on agreement between the first and second identification codes, the occupant of the vehicle is guided to visit the repair shop. As a result, the vehicle that suffers from the device failure, and the occupant of the vehicle, are reliably prevented from coming unnecessarily to the repair shop.

According to the present invention, there is further provided a vehicle, comprising an identification code storage unit for storing a first identification code, a second identification code acquiring unit for acquiring a second identification code and first related information delivered by a broadcast, an identification code comparator for comparing the first identification code and the second identification code with each other, and an information output unit for outputting the first related information if the first identification code and the second identification code, which are compared with each other by the identification code comparator, agree with each other.

According to the present invention, there is also provided a broadcasting apparatus for delivering, as a broadcast, a second identification code and first related information to a vehicle that stores a first identification code, wherein the first identification code and the second identification code are compared with each other, and the first related information is output if the first identification code and the second identification code agree with each other.

According to the present invention, as described above, the burden posed when delivering information to the vehicle is reduced.

According to the present invention, moreover, the vehicle, as well as the occupant (driver) thereof, can be prevented from coming unnecessarily to the repair shop.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3A is a diagram showing a message table;

FIG. 3B is a diagram showing the message table illustrated in FIG. 3A together with HVC data stored therein;

FIG. 4A is a diagram showing a reference table;

FIG. 4B is a diagram showing the message table illustrated in FIG. 3A together with HVC data stored therein;

DESCRIPTION OF THE PREFERRED EMBODIMENTS

Figure 1:
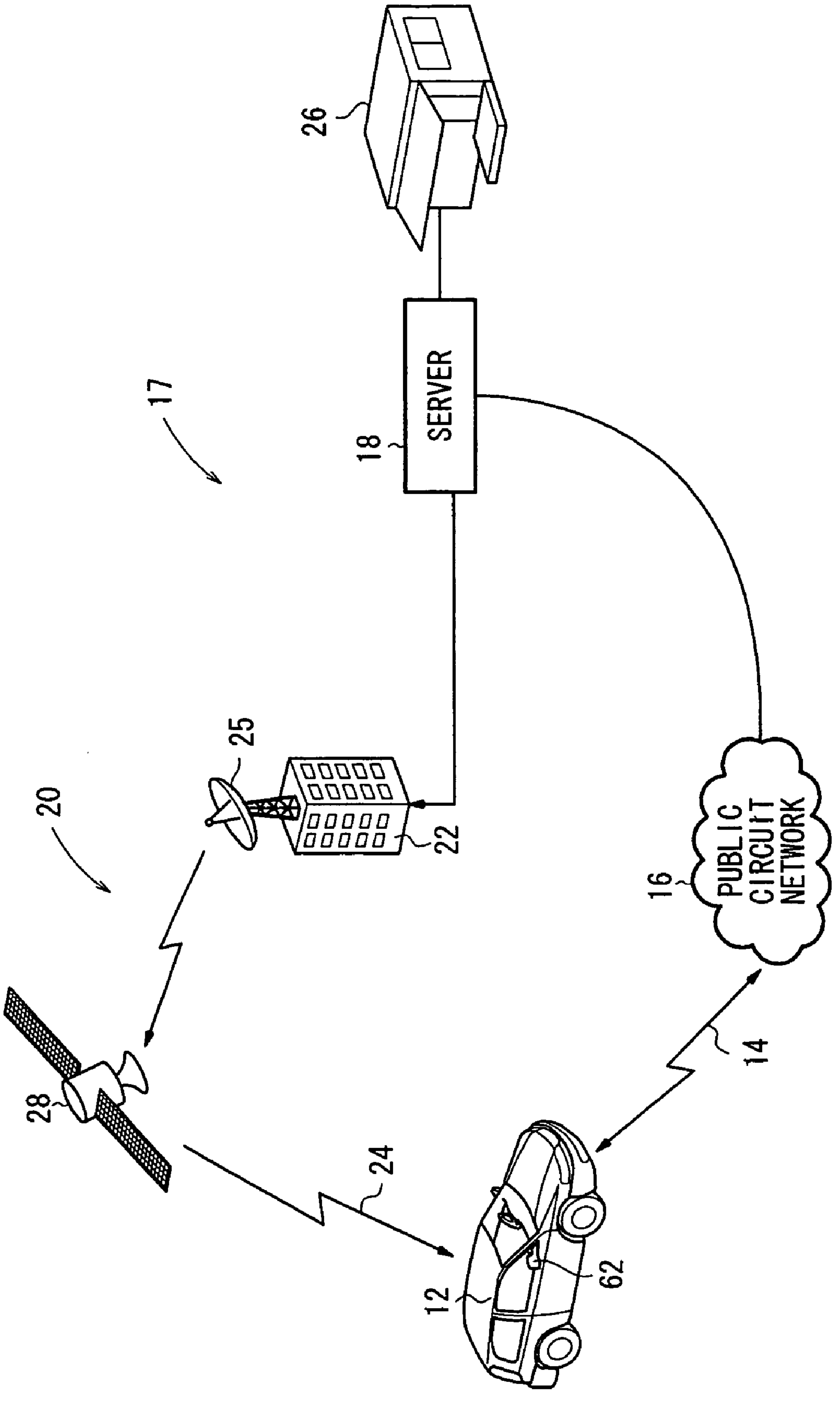
FIG. 1 is a schematic view of an overall arrangement of a visit-and-repair system, i.e., an information delivery system, according to the present invention.
Figure 2:
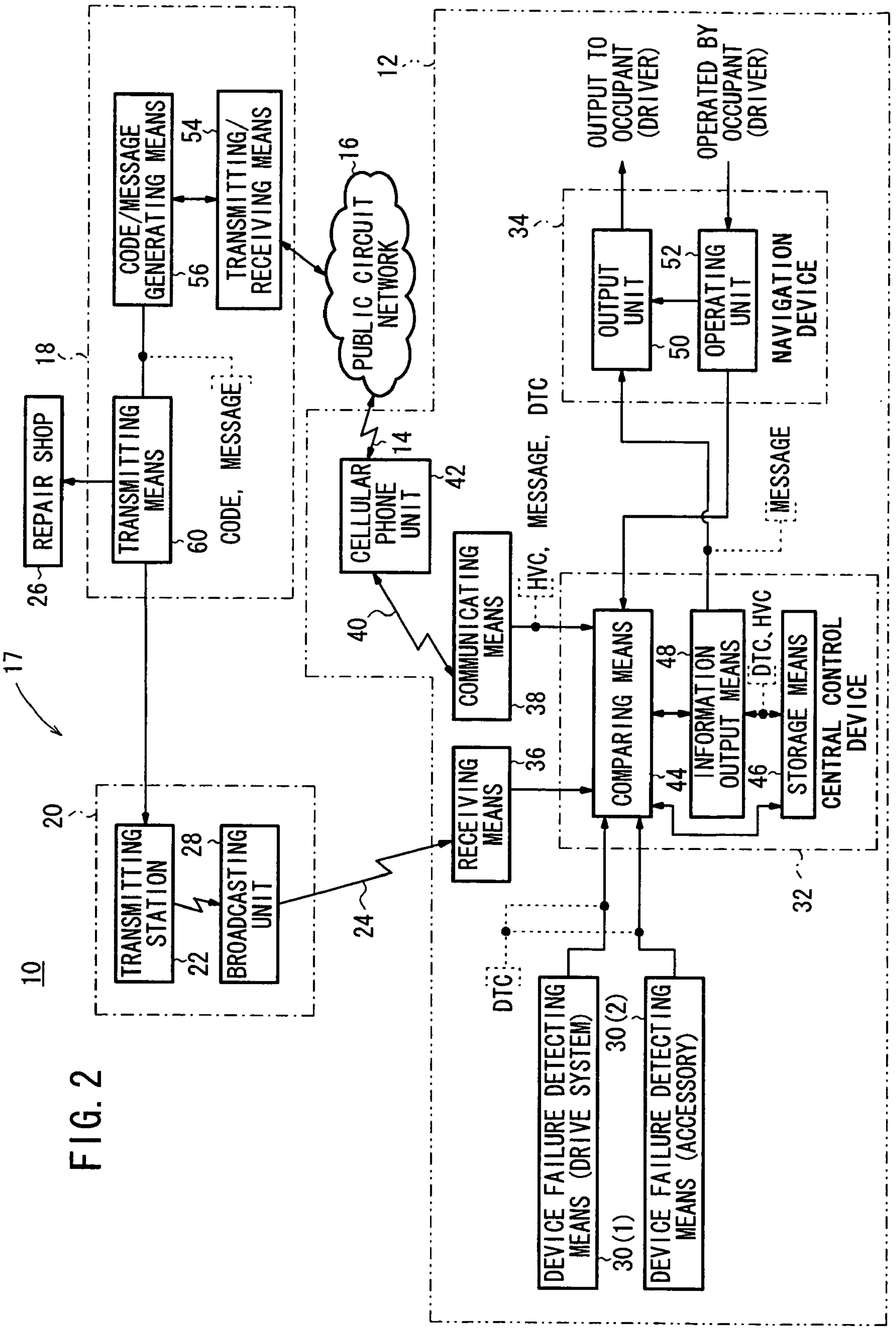
FIG. 2 is a block diagram of a vehicle and a broadcasting apparatus, pertaining to the visit-and-repair system shown in FIG. 1.

FIG. 1 schematically shows an overall arrangement of a visit-and-repair system 10, i.e., an information delivery system, according to the present invention. FIG. 2 shows in block form a vehicle 12 and a broadcasting apparatus 17 that pertain to the visit-and-repair system 10, wherein the broadcasting apparatus 17 includes a server 18 and a broadcasting means 20 for broadcasting data.

As shown in FIG. 1, the visit-and-repair system 10 basically comprises a vehicle 12, a server 18 connected to the vehicle 12 through a wireless link 14 using a public circuit network 16, including a mobile communications network such as a cellular phone network, a broadcasting means 20 for broadcasting data transmitted from the server 18 within a predetermined broadcasting area, and a repair shop 26, including a dealer and a service station for the vehicle 12. Specifically, the data transmitted from the server 18 includes a first code (first identification code), a second code (second identification code), a visit guidance message (first related information), and a hold visit message (second related information).

The broadcasting means 20 includes a transmitting station 22 for receiving data from the server 18 and sending the received data via radio waves 24 through an antenna 25, and a broadcasting unit 28, such as a broadcasting satellite or the like, for relaying radio waves 24 from the transmitting station 22, so as to deliver the data as a broadcast within the broadcasting area.

As shown in FIG. 2, the vehicle 12 comprises a device failure detecting means 30(1), 30(2), a central control device 32, a navigation device 34, a receiving means (first and second identification code acquiring means) 36, a communicating means 38, which serves as the first and second identification code acquiring means and as a failure information transmitting means, and a cellular phone unit 42.

The device failure detecting means 30(1) and 30(2) detect device failures of each of various devices mounted in the vehicle 12, and outputs a diagnostic trouble code (device failure information, hereinafter referred to as a DTC) representing the detected failure to the central control device 32.

The device failure represents a malfunction or failure of a device mounted in the vehicle 12, a condition in which a given state of a device falls outside of a predetermined range, or a condition in which a device should be inspected or replaced before the device fails. When a device failure occurs, the vehicle 12 typically needs to be moved to the repair shop 26 for repair, replacement, or inspection. The DTC is a code indicative of the name of the device that suffers from a failure, the situation of the device that suffers from the failure, and the type of device.

The device failure detecting means 30(1) comprises an ECU or a sensor for detecting a device failure of a drive system device on the vehicle 12. The device failure detecting means 30(1) includes means for detecting a failure of a fuel injector, means for detecting a malfunction or failure of the entire drive system, means for detecting a vehicle behavior malfunction, means for detecting a tire air pressure outside of a predetermined range, means for detecting a vehicle speed in excess of a predetermined speed, means for detecting a coolant temperature outside of a predetermined range, means for detecting that the engine oil has not been replaced after a predetermined traveled distance or a predetermined period, and means for detecting a malfunction or failure of a motor-operated power steering system.

The device failure detecting means 30(2) comprises a sensor for detecting a device failure of an accessory on the vehicle 12. The device failure detecting means 30(2) includes means for detecting a malfunction or failure of an air conditioner, means for detecting a malfunction or failure of a motor-driven door mirror, means for detecting a malfunction or failure of a system for locking and unlocking the vehicle 12 with a card key, i.e., a so-called smart key system, means for detecting a malfunction or failure of a combination switch, and means for detecting a malfunction or failure of an audio system.

The central control device 32 includes a comparing means (an identification code comparing means, a first identification code generating means, and a first identification code acquiring means) 44, a storage means (an identification code storage means) 46, and an information output means 48.

The storage means 46 includes a message table, as shown in FIGS. 3A, 3B, and 4B, and a reference table as shown in FIG. 4A.

The message table has one column (a left column as shown in FIGS. 3A, 3B, and 4B) for storing diagnostic trouble codes (DTCs) output from the device failure detecting means 30(1), 30(2), another column (a central column as shown in FIGS. 3A, 3B, and 4B) for storing hold visit messages (second related information), and another column (a right column as shown in FIGS. 3A, 3B, and 4B) for storing hold visit codes (hereinafter referred to as HVCs).

The reference table has one column (a left column in FIG. 4A), with a plurality of DTCs stored therein, and another column (a right column in FIG. 4), with a plurality of HVCs stored therein that correspond to the DTCs.

Data stored in the message table are updated or changed in any of the following situations, i.e., when a DTC is input from the device failure detecting means 30(1), 30(2) to the comparing means 44, when an HVC (first or second code) and a hold visit message or a visit guidance message are input from the receiving means 36 or the communicating means 38 to the comparing means 44, when an HVC (first code) is input from an operating unit 52 (see FIG. 2) to the comparing means 44, or when an HVC (first code) is generated by the comparing means 44 and stored in the storage means 46.

Data stored in the reference table are updated or changed in any of the following situations, i.e., when an HVC (first code) and a DTC are input from the receiving means 36 or the communicating means 38 to the comparing means 44, when an HVC (first code) is input from the operating unit 52 to the comparing means 44, or when an HVC (first code) is generated by the comparing means 44 and stored in the storage means 46.

The hold visit message (second related information) is a message for informing the occupant (driver) of the vehicle 12 to hold (postpone) bringing the vehicle 12 to the repair shop 26. (see FIG. 1), before a visit guidance message (first related information) received by the receiving means 36 is output to the navigation device 34.

The visit guidance message (first related information) is a message for guiding (instructing) the vehicle 12 that suffers from a device failure to visit the repair shop 26. The visit guidance message includes not only information for guiding the vehicle 12 with the device failure to visit the repair shop 26, but also includes various other guidance information, e.g., campaign information and maintenance information with respect to the vehicle 12, for guiding (instructing) the vehicle 12 and its occupant (driver) to visit the repair shop 26. Such guidance information is delivered from the broadcasting apparatus 17 to the vehicle 12, via radio waves 24 or via a wireless link 14 or a public circuit network 16.

The HVC is a code for determining whether data delivered to the vehicle 12 from the broadcasting means 20 via radio waves 24, or data delivered to the vehicle 12 from the server 18 via a public circuit network 16 or a wireless link 14, is data destined for the vehicle 12 itself or not.

Various codes included in the data delivered to the vehicle 12 from the broadcasting means 20 via radio waves 24, or included in the data delivered from the server 18 via the public circuit network 16 or the wireless link 14, may be codes common to a plurality of vehicles, i.e., representing types of vehicles, models of vehicles, and periods during which the vehicles were manufactured, as well as various codes such as IDs (so-called VIN numbers) that are inherent in vehicles. The HVC is one of these codes.

The central control device 32 shown in FIG. 2 operates, as described below, in the following situations: (1) when a code, an HVC (first code), and information (a hold visit message) are delivered from the broadcasting means 20 via radio waves 24 to the vehicle 12, (2) when an HVC (second code) and information (a visit guidance message) are delivered from the broadcasting means 20 via radio waves 24 to the vehicle 12 while an HVC (first code) is stored in the message table, (3) when an HVC and information (a visit guidance message) are delivered to the vehicle 12 from the server 18 via the wireless link 14 and the public circuit network 16 while an HVC (first code) is stored in the message table, and (4) when a DTC is acquired from the device failure detecting means 30(1), 30(2).

In the case of (1), the comparing means 44 determines whether the code received by the receiving means 36 is a code destined for the vehicle 12 itself or not. If the comparing means 44 judges that the received code is a code destined for the vehicle 12 itself, then the comparing means 44 outputs the judgment result to the information output means 48, and stores an HVC (first code) and a hold visit message in the storage means 46. The HVC is stored in a given position within the message table, i.e., in a given row in the HVC column shown in FIGS. 3A, 3B, and 4B. The hold visit message similarly is stored in a given position within the message table, i.e., in a given row in the message column shown in FIGS. 3A, 3B, and 4B.

Based on the input judgment result, the information output means 48 outputs the hold visit message, which is stored in the storage means 46, to an output unit 50 (see FIG. 2), and then deletes the hold visit message from the message table.

The comparing means 44 may also store the HVC and the hold visit message in the storage means 46 through the information output means 48. Further, rather than storing the hold visit message in the message table, the information output means 48 may output the hold visit message that is input to the output unit 50 from the comparing means 44.

In the case of (2) or (3), the comparing means 44 determines whether the HVC (second code) received by the receiving means 36 or the communicating means 38 and the HVC (first code) stored in the message table (see FIGS. 3A, 3B, and 4B) of the storage means 46 agree with each other or not. If the compared HVCs agree with each other, then the comparing means 44 determines that the information (visit guidance message) is information destined for the vehicle 12 itself, and outputs the determined result to the information output means 48 while storing the visit guidance message in the storage means 46. The visit guidance message is stored in a given position in the message table, i.e., in a given row within the message column shown in FIGS. 3A, 3B, and 4B.

Based on the determined result that was input, the information output means 48 outputs the visit guidance message stored in the storage means 46 to the output unit 50, and then deletes the visit guidance message and the HVC from the message table. Specifically, the information output means 48 resets "101" in the message table shown in FIG. 3B, and "100" in the message table shown in FIG. 4B, to "0", and deletes the message from the message column.

The comparing means 44 may store the visit guidance message in the storage means 46 via the information output means 48. Further, the information output means 48 may output the visit guidance message input from the comparing means 44 to the output unit 50, rather than storing the visit guidance message in the message table.

In the case of (4), the central control device 32 shown in FIG. 2 performs a process (4-1) of associating a DTC and an HVC (first code) with each other while outputting the DTC and the HVC to the communicating means 38, and a process (4-2) of not associating a DTC and an HVC (first code) with each other while outputting only the DTC to the communicating means 38.

In process (4-1), the comparing means 44 retrieves, from the reference table (see FIG. 4A), an HVC corresponding to a DTC that is input from the device failure detecting means 30(1), 30(2). Once the comparing means 44 has successfully received the HVC, then the comparing means 44 stores the DTC and the HVC in the message table, and outputs the DTC and the HVC to the communicating means 38. If a hold visit message corresponding to the DTC is stored in the message table, then the comparing means 44 outputs the retrieved result to the information output means 48. Based on the input retrieved result, the information output means 48 outputs the hold visit message corresponding to the DTC to the output unit 50, and then deletes the hold visit message from the message table. If no corresponding hold visit message is stored in the message table, then the comparing means does not output any retrieved result to the information output means 48.

In process (4-2), the comparing means 44 stores a DTC input from the device failure detecting means 30(1), 30(2) in the message table, and outputs the DTC to the communicating means 38. If a hold visit message corresponding to the DTC is stored in the message table, then the comparing means 44 outputs the retrieved result to the information output means 48, which indicates that the hold visit message is stored in the message table. Based on the input retrieved result, the information output means 48 outputs the hold visit message corresponding to the DTC to the output unit 50, and then deletes the hold visit message from the message table.

In cases (1) through (3), if the code received by the receiving means 36 is not a code destined for the vehicle 12 itself (case (1)), or if the received HVC and the HVC stored in the message table of the storage means 46 do not agree with each other (cases (2) and (3)), then the comparing means 44 does not store any of the HVC, the hold visit message, and the visit guidance message in the storage means 46, and the judged result, the HVC, the hold visit message, and the visit guidance message are not output to the information output means 48.

Therefore, when the vehicle 12 acquires an HVC, which is different from the HVC stored in the message table, from the broadcasting apparatus 17 via radio waves 24 or via the wireless link 14, the output unit 50 does not display information (a visit guidance message or a hold visit message) from the server 18, or information (a visit guidance message or a hold visit message) from the broadcasting means 20. Stated otherwise, the comparing means 44 functions as a filter, which compares the HVCs with each other in order to determine whether or not the visit guidance message or the hold visit message, acquired from either the server 18 or the broadcasting means 20, is a visit guidance message or a hold visit message with respect to a device failure of the vehicle 12 itself.

The navigation device 34 includes the output unit 50 and the operating unit (identification code inputting means) 52.

The output unit 50 outputs a hold visit message or a visit guidance message from the information output means 48, in the form of at least one of an image message and a speech message, which thereby instructs the occupant (driver) of the vehicle 12 to hold (postpone) visiting the repair shop 26, or directs the occupant (driver) of the vehicle 12 to visit the repair shop 26.

Data may be input to the operating unit 52 while the vehicle 12 is in a production factory, so as to store an HVC (first code) in the storage means 46 through the comparing means 44.

When the occupant (driver) of the vehicle 12 receives a hold visit message from the output unit 50, the occupant recognizes that the vehicle 12 is suffering from a device failure. Based on the hold visit message, the occupant may enter data into the operating unit 52, whereby the comparing means 44 outputs a DTC, or an HVC and a DTC, stored in the storage means 46 to the communicating means 38 based on the entered data. Based on the data entered into the operating unit 52 by the occupant, the receiving means 36 may acquire a first or second code (HVC), which is delivered from the broadcasting means 20 via radio waves 24, or the communicating means 38 may acquire a first or second code (HVC) from the server 18 via the public circuit network 16, the wireless links 14 and 40, and the cellular phone unit 42.

The output unit 50 should preferably be a display unit that displays the hold visit message or the visit guidance message as an image. The operating unit 52 should preferably be an operating unit, including a touch panel, which is displayed on the screen of the display unit.

The communicating means 38 transmits the DTC, or the HVC and the DTC, to the cellular phone unit 42 via the wireless link 40, which may be based on Bluetooth (registered trademark) technology or the like. The cellular phone unit 42 carried by the occupant transmits the DTC, or the HVC and the DTC, which have been received, to the server 18 via the wireless link 14 through the public circuit network 16.

The server 18 includes a transmitting/receiving means (failure information receiving means and identification code transmitting means) 54, a code/message generating means 56, and a transmitting means 60.

The transmitting/receiving means 54 receives the DTC, or the HVC and the DTC, from the vehicle 12, and outputs the DTC, or the HVC and the DTC, which have been received from the vehicle 12, to the code/message generating means 56. The transmitting/receiving means 54 also transmits an HVC (first and second codes) and a visit guidance message, or a hold visit message, from the code/message generating means 56 to the vehicle 12, via the wireless link 14 through the public circuit network 16.

Based on the DTC from the transmitting/receiving means 54, the code/message generating means 56 recognizes that the vehicle 12 has requested the server 18 to handle the device failure, analyzes the device failure based on the name of the failed device, the failure details thereof, and the device type, which are included in the DTC, and indicates analyzed results, which represent how the device failure should be handled, to the repair shop 26 through the transmitting means 60.

The repair shop 26 then prepares a replacement (repair product) for the failed device, based on the device failure, and notifies the server 18 when the repair product has been prepared.

Based on a notice from the repair shop 26, the code/message generating means 56 generates a visit guidance message and an HVC (second code) corresponding to the DTC, or a hold visit message and an HVC (first code), adds the visit guidance message or the hold visit message to the generated HVC, and outputs the HVC and the visit guidance message or the hold visit message to the transmitting/receiving means 54.

Specifically, when only the DTC has been input, the code/message generating means 56 generates an HVC (first code) and a hold visit message, or an HVC (second code) and a visit guidance message, and then delivers the HVC and the hold visit message or the visit guidance message to the vehicle 12 through the broadcasting means 20 or through the transmitting/receiving means 54. When the DTC and the HVC (first code) are input, the code/message generating means 56 operates as follows:

An HVC (first code) and a DTC are input from the vehicle 12 to the server 18 via the wireless link 14 through the public circuit network 16, and the server 18 delivers a visit guidance message to the vehicle 12, in response to both the HVC and the DTC. In this case, the code/message generating means 56 generates an HVC (second code) for delivering information based on the HVC and the DTC that have been input, and transmits the HVC and the visit guidance message from the transmitting/receiving means 54 to the vehicle 12 through the public circuit network 16 and the wireless link 14, or alternatively, delivers the HVC and the visit guidance message from the transmitting means 60 to the vehicle 12, through the broadcasting means 20 and via radio waves 24.

An HVC (first code) and a DTC are input from the vehicle 12 to the server 18, whereupon the server 18 delivers a hold visit message to the vehicle 12 in response to the HVC and the DTC. In this case, the code/message generating means 56 transmits the input HVC and a generated hold visit message from the transmitting/receiving means 54 to the vehicle 12 through the public circuit network 16 and the wireless link 14, or alternatively, delivers the HVC and the hold visit message from the transmitting means 60 to the vehicle 12 via the broadcasting means 20 and radio waves 24.

Even in the absence of a request from the vehicle 12 to handle a device failure, the code/message generating means 56 is able to generate a code, an HVC, a hold visit message, and a visit guidance message, in anticipation of future device failures that may occur in the vehicle 12. Specifically, if a device failure has not occurred on the vehicle 12, although the same or similar device failures have already occurred on other vehicles of the same model, or on vehicles of the same type or which were manufactured during the same year as the vehicle 12, or if, for other reasons, a device failure may be expected to occur in the future on the vehicle 12, then when processes are established for handling such device failures, the code/message generating means 56 generates a code, an HVC, a hold visit message, and a visit guidance message.

Specifically, the code/message generating means 56 generates a code specified by the type of vehicle 12, the model of the vehicle 12, and the period during which the vehicle 12 was manufactured, an HVC, and a hold visit message, adds the HVC and the hold visit message to the code, and outputs the code, along with the HVC and the hold visit message added thereto, to the transmitting means 60. The transmitting means 60 transmits the code, the HVC, and the hold visit message to the transmitting station 22, which sends the code, the HVC, and the hold visit message over radio waves 24 from the antenna 25 to the broadcasting unit 28. The broadcasting unit 28 then relays the radio waves 24 in order to transmit the code, the HVC, and the hold visit message as a broadcast within a given broadcasting area.

After having output the code, the HVC, and the hold visit message, when the code/message generating means 56 receives a notification from the repair shop 26, the code/message generating means 56 generates a visit guidance message, adds the generated visit guidance message to the HVC, and outputs the HVC, along with the added visit guidance message, to the transmitting means 60. The transmitting means 60 transmits the HVC and the visit guidance message to the transmitting station 22, which sends the HVC and the visit guidance message over radio waves 24 from the antenna 25 to the broadcasting unit 28. The broadcasting unit 28 then relays the radio waves 24 in order to transmit the HVC and the visit guidance message as a broadcast within the given broadcasting area.

If the vehicle 12 is inside the given broadcasting area, then the receiving means 36 receives the code, the HVC, and the hold visit message, or the HVC and the visit guidance message, via radio waves 24, and outputs the code, the HVC, and the hold visit message, or the HVC and the visit guidance message, to the comparing means 44.

If the HVC and the visit guidance message are stored in advance in the storage means 46, then the code/message generating means 56 basically is not required to output the code, the HVC, and the hold visit message to the transmitting means 60. However, if the HVC and the visit guidance message, which are stored in the storage means 46, need to be updated, then the code/message generating means 56 outputs the code, the HVC, and the hold visit message to the transmitting means 60.

Based on a notification from the server 18, the repair shop 26 recognizes the vehicle 12 that is to visit the repair shop 26, along with the device failure details of the vehicle 12, and therefore prepares a repair product to replace the device that suffers from the device failure, before the vehicle 12 actually visits and arrives at the repair shop 26.

The visit-and-repair system 10 according to the present invention, and the vehicle 12 and broadcasting apparatus 17 of such a visit-and-repair system 10, are basically constructed as described above. Next, details of various processing sequences of the visit-and-repair system 10 shall be described below with reference to FIGS. 1 through 8.

Specifically, processing sequences according to first through fourth embodiments (1) through (4) shall be described below.

(1) First embodiment: After the vehicle 12 has acquired a code, an HVC (first code), and a hold visit code via radio waves 24, the vehicle 12 acquires an HVC (second code) and a visit guidance message (information) via radio waves 24.

(2) Second embodiment: An HVC (first code) is stored in advance in the message table, and the vehicle 12 acquires an HVC (second code) and a visit guidance message via radio waves 24.

(3) Third embodiment: The vehicle 12 transmits a DTC to the server 18, via the wireless link 14 through the public circuit network 16, and the server 18 delivers a code, an HVC (first code), and a hold visit message corresponding to the DTC to the vehicle 12, via the wireless link 14 through the public circuit network 16, and thereafter delivers an HVC (second code) and a visit guidance message via radio waves 24.

(4) Fourth embodiment: The vehicle 12 transmits an HVC (first code) and a DTC to the server 18, via the wireless link 14 through the public circuit network 16, and the server 18 delivers a code, the HVC, and a hold visit message, or an HVC (second code) and a visit guidance message to the vehicle 12, via the wireless link 14.

The first through fourth embodiments (1) through (4) shall be described below in the order named.

In the following descriptions of the first and second embodiments, for example, a device failure of a motor-driven door mirror 62 (see FIG. 1), which cannot be properly stored, shall be handled. In the following descriptions of the third and fourth embodiments, for example, a device failure of an air conditioner temperature sensor (not shown) on the vehicle 12 shall be handled.

(1) First embodiment (see FIGS. 1 through 3B, 5):

In the first embodiment, it is assumed that a device failure (in which the motor-driven door mirror 62 cannot be properly stored) has not yet occurred on the vehicle 12, although the same device failure has already occurred on other vehicles, which are of the same model or type, or which were manufactured during the same year, as the vehicle 12. In such a case, the device failure can be handled based on an analysis of the device failure, which has been conducted by the broadcasting apparatus 17.

Figure 5:
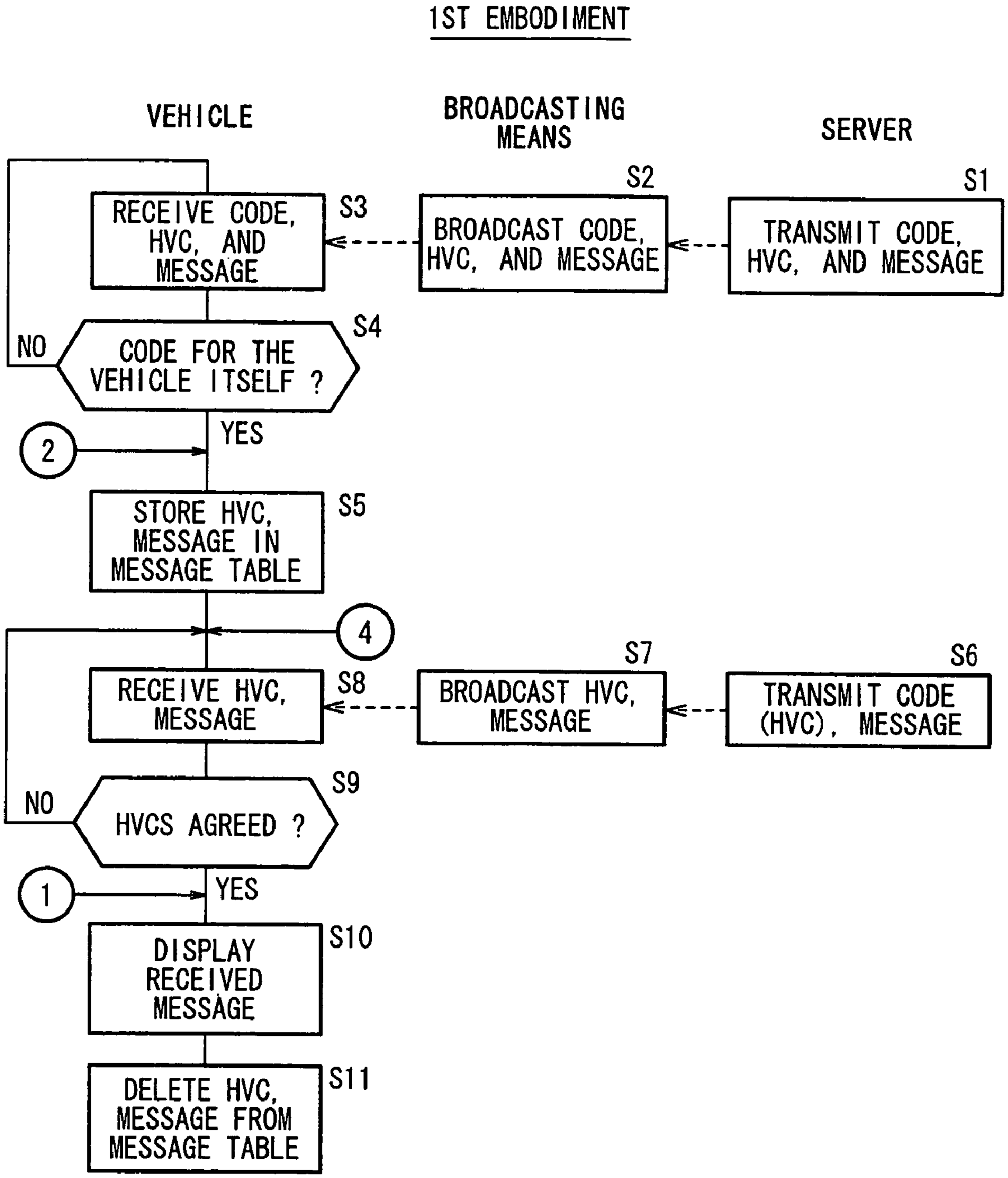
FIG. 5 is a flowchart showing details of a processing sequence according to a first embodiment of the present invention.

In the processing sequence shown in FIG. 5, the code/message generating means 56 of the server 18 (see FIGS. 1 and 2) generates a code, an HVC (first code), and a hold visit message corresponding to the device failure, based on the result of an analysis of the device failure concluding that the motor-driven door mirror 62 cannot be properly stored, adds the HVC and the hold visit message to the code, and outputs the code with the HVC and the hold visit message added thereto to the transmitting means 60. The transmitting means 60 transmits the code, the HVC, and the hold visit message to the transmitting station 22 (step S1). When the transmitting means 60 transmits the code, the HVC, and the hold visit message to the transmitting station 22, the transmitting means 60 also sends an instruction signal through the transmitting means 60, instructing the repair shop 26 to prepare a replacement (repair product) for the motor-driven door mirror 62. Based on the instruction signal from the transmitting means 60, the repair shop 26 prepares a replacement for the motor-driven door mirror 62.

The transmitting station 22 sends the code, the HVC, and the hold visit message from the antenna 25 to the broadcasting unit 28 via radio waves 24. The broadcasting unit 28 relays the radio waves 24 in order to transmit the code, the HVC, and the hold visit message as a broadcast within a given broadcasting area (step S2).

The receiving means 36 of the vehicle 12, which is inside the broadcasting area, receives the transmitted code, the HVC, and the hold visit message, and then outputs the code, the HVC, and the hold visit message, which have been received, to the comparing means 44 (step S3).

The comparing means 44 determines whether the code received by the receiving means 36 is a code destined for the vehicle 12 itself or not (step S4). If the comparing means 44 determines in step S4 that the received code is a code destined for the vehicle 12 itself, then the comparing means 44 stores the HVC ("101" in FIG. 3B) and the hold visit message in the message table (step S5), and outputs the determined result to the information output means 48.

Since the HVC is a code representing a device failure of the motor-driven door mirror 62 (see FIG. 1), the comparing means 44 stores the HVC and the hold visit message, which have been input thereto, into the same row as a DTC ("P0301") that corresponds to the device failure of the motor-driven door mirror 62, which is stored in the third row of the message table.

Based on the input determined result, the information output means 48 reads the hold visit message from the message table, outputs the hold visit message to the output unit 50, and deletes the hold visit message from the message table. As a result, the occupant (driver) of the vehicle 12 recognizes the information, "MOTOR-DRIVEN DOOR MIRROR CANNOT BE PROPERLY STORED. WAIT AWHILE UNTIL WE LET YOU KNOW THAT A REPAIR PRODUCT HAS BEEN PREPARED", which is output as an image message or a speech message from the output unit 50, and keeps the driver from bringing the vehicle 12 to the repair shop 26.

If the HVC and the hold visit message have been stored in advance in the message table in step S4, then the comparing means 44 updates the HVC and the hold visit message stored in the message table, using the HVC and the hold visit message that are input to the comparing means 44.

If the comparing means 44 determines, in step S4, that the received code is not a code destined for the vehicle 12 itself, then the comparing means 44 does not store the HVC and the hold visit message, which have been input thereto, in the storage means 46. In this case, the comparing means 44 does not output the compared result to the information output means 48, and continues to wait until a code and an HVC are input again from the receiving means 36.

In step S5, the information output means 48 may output the hold visit message to the output unit 50, rather than storing the hold visit message in the storage means 46.

After the repair shop 26 (see FIGS. 1 and 2) prepares a replacement for the motor-driven door mirror 62, the repair shop 26 notifies the server 18 with information that the replacement has been prepared.

Based on the notification from the repair shop 26, the code/message generating means 56 generates a visit guidance message for directing the vehicle 12 to visit the repair shop 26, adds the generated visit guidance message to an already generated HVC (second code), and outputs the HVC, with the visit guidance message added thereto, to the transmitting means 60. The transmitting means 60 then transmits the HVC and the visit guidance message to the transmitting station 22 (step S6).

The transmitting station 22 transmits the HVC and the visit guidance message, which have been received from the antenna 25, to the broadcasting unit 28 via radio waves 24. The broadcasting unit 28 relays the radio waves 24 in order to transmit the HVC and the visit guidance message as a broadcast within a given broadcasting area (step S7).

The receiving means 36 of the vehicle 12, which is inside the broadcasting area, receives the transmitted HVC and the visit guidance message, and outputs the HVC and the visit guidance message, which have been received, to the comparing means 44 (step S8).

The comparing means 44 determines whether the input HVC agrees with the HVC ("101" stored in the HVC column shown in FIG. 3B) stored in the message table (FIG. 3B) or not (step S9). If the comparing means 44 determines, in step S9, that the input HVC (second code) agrees with the stored HVC (first code), the comparing means 44 then stores the input visit guidance message in a location (third row in the message column shown in FIG. 3B) where the hold visit message is stored, and outputs the determined result, which indicates code agreement, to the information output means 48.

Based on the input determined result, the information output means 48 outputs the visit guidance message stored in the message table (see FIG. 3B) to the output unit 50 (step S10), resets the HVC ("102") in the message table to "0", and deletes the visit guidance message (step S11). As a result, the occupant (driver) of the vehicle 12 recognizes the information, "REPAIR PRODUCT HAS BEEN PREPARED. PLEASE COME TO THE DEALER", which is output as an image message or a speech message from the output unit 50, and is advised to bring the vehicle 12 to the repair shop 26.

When the vehicle 12 and the driver come to the repair shop 26, the motor-drive door mirror 62 on the vehicle 12 is replaced with the prepared repair product in the repair shop 26.

If the comparing means 44 determines, in step S9, that the input HVC does not agree with the stored HVC, then the comparing means 44 does not store the input visit guidance message in the storage means 46, does not output the determined result to the information output means 48, and continues to wait until an HVC and a visit guidance message are input again from the receiving means 36.

In step S10, the information output means 48 may output the visit guidance message to the output unit 50, rather than storing the visit guidance message in the storage means 46.

In the first embodiment, if a hold visit message is stored in advance in the message table and does not need to be updated, then the server 18 may not have to generate and transmit a hold visit message. In this case, the broadcasting means 20 does not broadcast the hold visit message, and simply delivers only a code and an HVC to the vehicle 12.

In step S2, according to the first embodiment, the code, the HVC, and the hold visit message are delivered as a broadcast to the vehicle 12. However, the code, the HVC, and the hold visit message may also be delivered from the transmitting/receiving means 54 to the vehicle 12, via the wireless link 14 through the public circuit network 16.

(2) Second embodiment (see FIGS. 1 through 3B, 5, 6):

In the second embodiment, at the time the vehicle 12 is manufactured, it is assumed that a device failure (in which the motor-driven door mirror cannot be properly stored) has already occurred on other vehicles which are of the same model, the same type, or which were manufactured during the same year, as the vehicle 12. However, since an analysis of the device failure has not yet been completed, an HVC is stored in advance in the message table when the vehicle 12 is shipped. Thus, when it becomes possible to handle the device failure, due to analysis of the device failure in the broadcasting apparatus 17, the vehicle 12 is guided to visit the repair shop 26.

Figure 6:
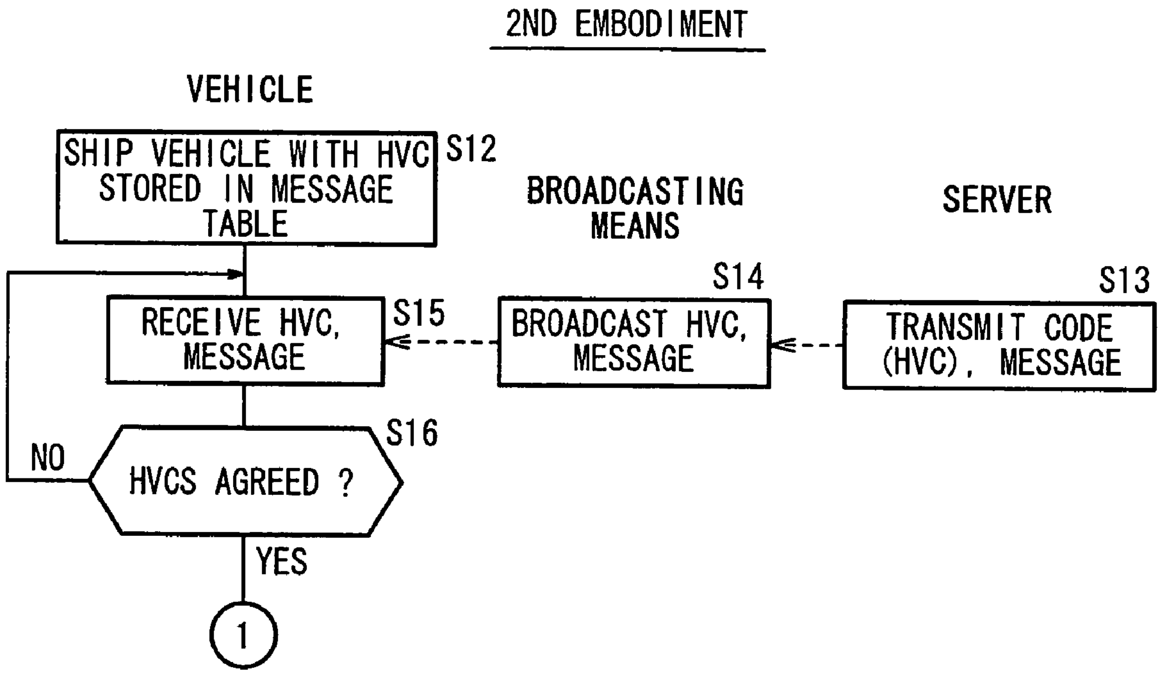
FIG. 6 is a flowchart showing details of a processing sequence according to a second embodiment of the present invention.

In the processing sequence shown in FIG. 6, in the production factory for producing the vehicle 12 (see FIGS. 1 and 2), an HVC (first code) is stored in the message table of the vehicle 12, based on a device failure, which has occurred on other vehicles, and which indicates that the motor-driven door mirror cannot be properly stored. When the worker in the production factory operates the operating unit 52 in order to enter the HVC, the HVC is output to the comparing means 44. The comparing means 44 determines that the entered HVC ("101") is an HVC representing a device failure of the motor-driven door mirror, and stores the HVC in the same row as the DTC ("P0301") corresponding to the device failure of the motor-driven door mirror 62, which is stored in the HVC column. The vehicle 12, with the HVC stored in the message table, is then shipped out of the production factory (step S12).

Thereafter, when the code/message generating means 56 of the server 18 (see FIGS. 1 and 2) establishes a solution to handle the device failure, in which the motor-driven door mirror cannot be properly stored on other vehicles, the code/message generating means 56 sends a notification, via the transmitting means 60, in order to instruct the repair shop 26 to prepare a replacement for the motor-driven door mirror 62 of the vehicle 12. Based on the notification, the repair shop 26 prepares a replacement part for the motor-driven door mirror 62. Once the repair shop 26 has prepared the replacement for the motor-driven door mirror 62, the repair shop 26 notifies the server 18 that such a replacement has been prepared.

As with step S26 (see FIG. 5), based on a notification from the repair shop 26, the code/message generating means 56 generates a visit guidance message, which directs the vehicle 12 to visit the repair shop 26, adds the generated visit guidance message to the same HVC (second code) that was used when the vehicle 12 was shipped, and outputs the HVC, with the visit guidance message added thereto, to the transmitting means 60. The transmitting means 60 transmits the HVC, along with the visit guidance message, to the transmitting station 22 (step S13).

As with step S7 (see FIG. 5), the transmitting station 22 transmits the HVC, and the visit guidance message which have been received from the antenna 25, to the broadcasting unit 28 via radio waves 24. The broadcasting unit 28 relays the radio waves 24 in order to transmit the HVC and the visit guidance message as a broadcast within a given broadcasting area (step S14).

The receiving means 36 of the vehicle 12, which is inside the broadcasting area, receives the transmitted HVC and the visit guidance message, and outputs the received HVC and the visit guidance message to the comparing means 44 (step S15).

The comparing means 44 determines whether or not the input HVC agrees with the HVC that is stored in the message table (FIG. 3B) (step S16). If the comparing means 44 determines in step S9 that the input HVC agrees with the stored HVC, then processing from step S10, as shown in FIG. 5, is carried out in the vehicle 12.

If the comparing means 44 judges in step S16 that the input HVC does not agree with the stored HVC, then the comparing means 44 does not store the input visit guidance message in the storage means 46, does not output the determined result to the information output means 48, and continues to wait until an HVC and a visit guidance message are input again from the receiving means 36.

In step S14, according to the second embodiment, the HVC and the visit guidance message are delivered as a broadcast to the vehicle 12. However, the HVC and the visit guidance message may also be delivered from the transmitting/receiving means 54 to the vehicle 12, via the wireless link 14 through the public circuit network 16.

In step S12, according to the second embodiment, an HVC is entered into the message table of the vehicle 12 in the production factory. However, the HVC may also be entered manually in the repair shop 26, at a dealer or the like, rather than in the production factory.

(3) Third embodiment (see FIGS. 1 through 3A, 4B, 5, 7):

In the third embodiment, it is assumed that the device failure detecting means 30(2) detects a device failure (device failure of an air conditioner temperature sensor) in the vehicle 12 and outputs a DTC, whereupon the vehicle 12 transmits the DTC to the server 18, and based on the DTC, the server 18 delivers an HVC (first code) and a hold visit message, or an HVC (second code) and a visit guidance message, to the vehicle 12, based on the DTC.

Figure 7:
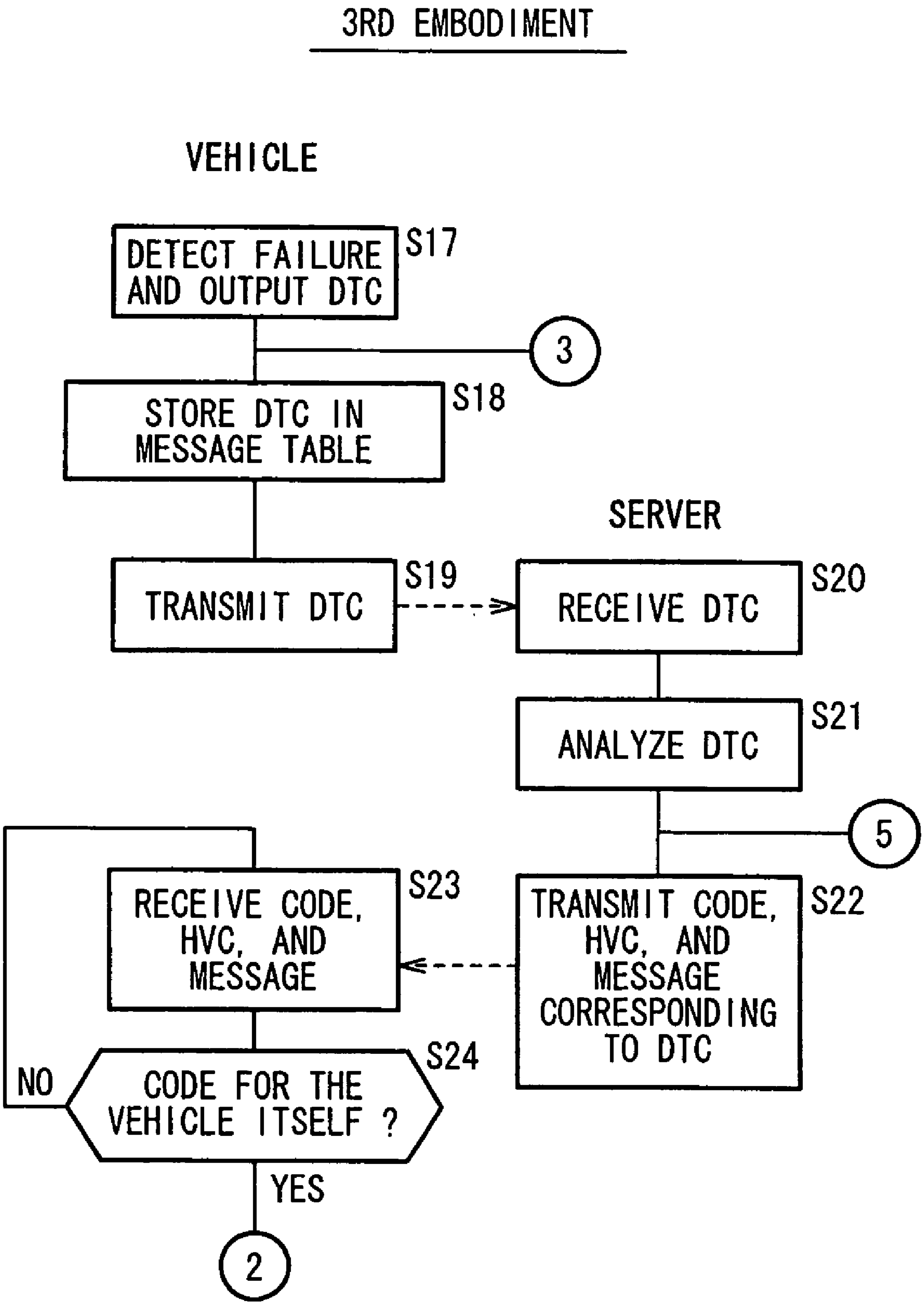
FIG. 7 is a flowchart showing details of a processing sequence according to a third embodiment of the present invention.
Figure 8:
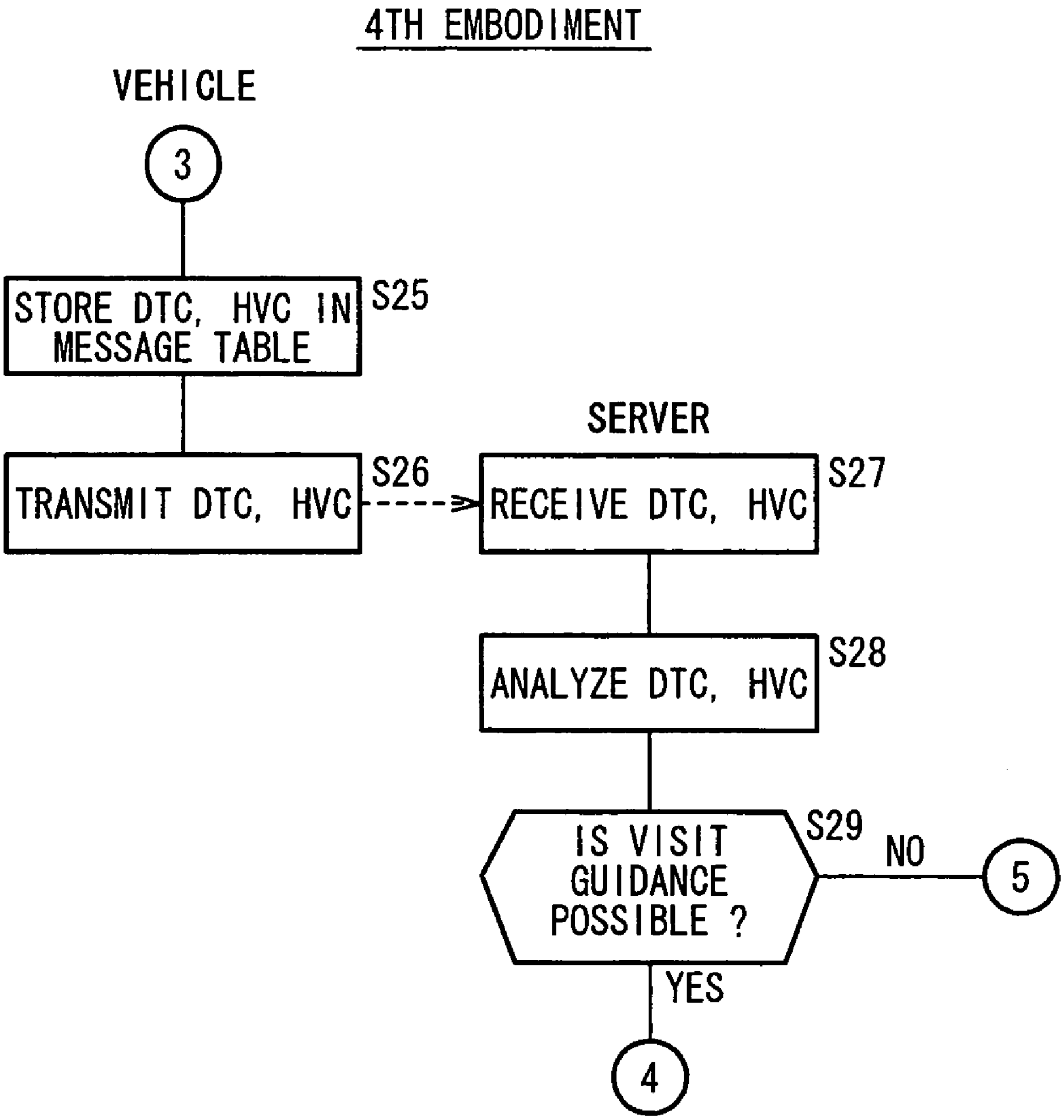
FIG. 8 is a flowchart showing details of a processing sequence according to a fourth embodiment of the present invention.

In the processing sequence shown in FIG. 7, the device failure detecting means 30(2) detects a device failure of the temperature sensor, and outputs the detected result as a DTC to the comparing means 44 (step S17).

The comparing means 44 stores the input DTC in the message table (see FIG. 4A) (step S18), and then outputs the input DTC to the communicating means 38. Specifically, the comparing means 44 stores the input DTC in the second row of the DTC column ("P0300" in the left column shown in FIG. 4A).

The communicating means 38 transmits the input DTC to the cellular phone unit 42 via the wireless link 40. The cellular phone unit 42 then transmits the received DTC to the server 18, via the wireless link 14 through the public circuit network 16 (step S19).

The transmitting/receiving means 54 of the server 18 receives the DTC, and outputs the received DTC to the code/message generating means 56 (step S20). The code/message generating means 56 analyzes the DTC (step S21), recognizes the device failure of the temperature sensor, and sends a notification, via the transmitting means 60, in order to instruct the repair shop 26 to prepare a replacement for the temperature sensor.

As with step S1 (see FIG. 1), based on the notification, the code/message generating means 56 generates a code corresponding to the device failure, a hold visit message for holding the visit of the vehicle 12 to the repair shop 26, and an HVC (first code) based on the notification. The code/message generating means 56 adds the hold visit message to the code and the HVC, and outputs the hold visit message, the code, and the HVC to the transmitting/receiving means 54.

The transmitting/receiving means 54 transmits the code, the HVC, and the hold visit message, which have been input to the vehicle 12, via the wireless link 14 through the public circuit network 16 (step S22). The cellular phone unit 42 of the vehicle 12 transmits the code, the HVC, and the hold visit message to the communicating means 38, via the wireless link 40 (step S23). The communicating means 38 outputs the code, the HVC, and the hold visit message to the comparing means 44.

As with step S4 (see FIG. 5), the comparing means 44 determines whether or not the input code is a code destined for the vehicle 12 itself (step S24). If the comparing means 44 determines in step S24 that the input code is a code destined for the vehicle 12 itself, then processing according to step S5 is performed in order to store the HVC and the hold visit message in the message table. According to the third embodiment, the processing step S6, as shown in FIG. 3, is subsequently carried out.

If the comparing means 44 determines in step S24 that the received code is not a code destined for the vehicle 12 itself, then the comparing means 44 does not store the HVC and the hold visit message, which have been input thereto, in the message table, and continues to wait until a code, an HVC, and a hold visit message are input again from the receiving means 36.

In steps S22 and S23, according to the third embodiment, the code, the HVC, and the hold visit message are transmitted from the transmitting/receiving means 54 to the vehicle 12, via the wireless link 14 through the public circuit network 16. However, as with steps SI through S3 shown in FIG. 5, the code, the HVC, and the hold visit message may also be delivered to the vehicle 12 as a broadcast from the broadcasting means 20.

(4) Fourth embodiment (see FIGS. 1 through 5, 8):

In the fourth embodiment, it is assumed that the device failure detecting means 30(2) detects a device failure (device failure of an air conditioner temperature sensor) in the vehicle 12 and outputs a DTC, whereupon the vehicle 12 transmits the DTC and an HVC (first code) to the server 18, and based on the DTC and the HVC, the server 18 delivers the HVC and a hold visit message, or an HVC (second code) and a visit guidance message, to the vehicle 12, based on the DTC and the HVC.

The fourth embodiment is the same as the first embodiment (see FIG. 5) and the third embodiment (see FIG. 7), except that the server 18 generates and delivers the HVC and a hold visit message, or an HVC (second code) and a visit guidance message, to the vehicle 12 based on the DTC and the HVC that have been received. Only those features of the fourth embodiment, which differ from the first and third embodiments, shall be described below.

In step S25, the comparing means 44 retrieves an HVC ("100") corresponding to the input DTC ("P0300") from the reference table (see FIG. 4A), and stores the DTC and the retrieved HVC in the message table (see FIG. 4B). Specifically, the comparing means 44 determines that the HVC ("100") stored in the second row of the HVC column in the reference table corresponds to the DTC ("P0300"), stores the HVC in the second row of the HVC column in the message table, and stores the DTC in the second row of the DTC column in the message table. Alternatively, in step S25, the comparing means 44 may generate an HVC ("100") corresponding to the input DTC, and store the DTC and the HVC in the message table.

Then, the comparing means 44 outputs the DTC and the HVC that are stored in the message table to the communicating means 38. The communicating means 38 transmits the DTC and the HVC, which have been input thereto, to the cellular phone unit 42 via the wireless link 40. The cellular phone unit 42 transmits the DTC and the HVC to the server 18, via the wireless link 14 through the public circuit network 16 (step S26).

The transmitting/receiving means 54 of the server 18 receives the DTC and the HVC, and outputs the DTC and the HVC to the code/message generating means 56 (step S27). The code/message generating means 56 analyzes the DTC and the HVC (step S28), thus recognizing the device failure of the temperature sensor, and sends a notification via the transmitting means 60 in order to instruct the repair shop 26 to prepare a replacement part for the temperature sensor.

In this case, the code/message generating means 56 determines whether the vehicle 12 can be directed to visit the repair shop 26 or not (step S29). Specifically, if the code/message generating means 56 establishes a solution to handle the temperature sensor device failure, and the repair shop 26 has already prepared a replacement therefore, then the code/message generating means 56 delivers a visit guidance message to the vehicle 12, which judges that it is necessary to direct the vehicle 12 to visit the repair shop 26, and then performs the processing from step S6, as shown in FIG. 5. If the repair shop 26 has not yet prepared a replacement, and has not sent a notification to the server 18 indicating that the replacement has been prepared, then the code/message generating means 56 delivers a hold visit message to the vehicle 12, which judges that it is necessary to hold (postpone) bringing the vehicle 12 to the repair shop 26, and then performs the processing from step S22, as shown in FIG. 7.

According to the present embodiment, as described above with respect to the first embodiment (see FIGS. 1 through 5), the broadcasting apparatus 17 delivers a code, an HVC (first code), and a hold visit message via a first broadcast to the vehicle 12 that is inside the broadcasting area of the broadcasting means 20. In a second broadcast, after the code, the HVC, and the hold visit message have been delivered, the broadcasting apparatus 17 delivers an HVC (second code) and a visit guidance message to the vehicle 12 in the broadcasting area of the broadcasting means 20.

When the HVC, which is received by the receiving means 36 and stored in the storage means 46 in connection with the first broadcast, agrees with the HVC received by the receiving means 36 in connection with the second broadcast, the information output means 48 outputs a visit guidance message to the output unit 50. Stated otherwise, since the comparing means 44 functions as a filter when outputting the visit guidance message to the output unit 50, only a vehicle 12, which actually stores the HVC, can output the visit guidance message from the information output means 48 to the output unit 50.

Therefore, when the broadcasting apparatus 17 delivers information, which is to be delivered to a plurality of vehicles 12 that store the HVC, and provides visit guidance message in one broadcast inside of a predetermined broadcasting area via radio waves 24, then each of the vehicles 12 within the broadcasting area can output the acquired visit guidance message to the output unit 50. As a result, the burden posed on the broadcasting apparatus 17 when delivering information to the vehicles 12 is reduced, and the visit guidance message can reliably be delivered to the vehicles 12 within the broadcasting area.

As described above, the visit guidance message refers to information that is to be delivered to the vehicle 12 via radio waves 24, wherein the information includes various guidance information items, including campaign information and maintenance information with respect to the vehicle 12. When the various guidance information items for the occupant (driver) of the vehicle 12 are delivered as a visit guidance message to the vehicle 12, the vehicle 12 and the occupant can be prevented from coming unnecessarily to the repair shop 26. Further, since the visit guidance message is delivered via a broadcast instead of in written form, then since such a written guidance notification is not required, the costs required for sending the guidance information can be reduced.

When the hold visit message stored in the message table is output to the output unit 50, before the visit guidance message is output to the output unit 50, the occupant of the vehicle 12 recognizes the hold visit message through the information output means 48 and the output unit 50. As a result, since the hold visit message is output at an early stage, the vehicle 12 and the occupant are prevented from visiting the repair shop 26 before the visit guidance message is output to the output unit 50.

Furthermore, because the information output means 48 resets the HVC that is stored in the message table each time the visit guidance message is output to the output unit 50, the output unit 50 is prevented from outputting information (i.e., visit guidance message) redundantly.

According to the present embodiment, as described above with respect to the second embodiment (see FIGS. 1 through 6), the broadcasting apparatus 17 delivers an HVC (second code) and a visit guidance message, as a broadcast to each of the vehicles 12 within the broadcasting area. When the HVC (first code) stored in the storage means 46 and the HVC received by the receiving means 36 agree with each other, the information output means 48 outputs the visit guidance message to the output unit 50.

In this case, as with the first embodiment, since only a vehicle 12 which stores the HVC can output the visit guidance message from the information output means 48 to the output unit 50, the burden posed on the broadcasting apparatus 17 in delivering information to the vehicles 12 is reduced, and the visit guidance message can reliably be delivered to the vehicles 12 within the broadcasting area.

According to the present embodiment, as described above with respect to the third embodiment (see FIGS. 1 through 7), when the server 18 of the broadcasting apparatus (information delivering apparatus) 17 receives a DTC from the vehicle 12, via the wireless link 14 through the public circuit network 16, the server 18 generates an HVC (first code) and a hold visit message, or an HVC (second code) and a visit guidance message, based on the received DTC. If the comparing means 44 judges that the HVC received by the communicating means 38 and the HVC stored in the message table agree with each other, the information output means 48 outputs the hold visit message and the visit guidance message to the output unit 50.

Accordingly, only a vehicle 12 that transmits the DTC to the broadcasting apparatus 17 and stores the HVC can output the hold visit message and the visit guidance message to the output unit 50. Thus, it is possible to deliver the hold visit message and the visit guidance message only to the vehicle 12, which actually has transmitted the DTC to the broadcasting apparatus 17.

When the broadcasting apparatus 17 receives the same DTC from a plurality of vehicles 12, based on the DTC, the broadcasting apparatus 17 generates an HVC and a hold visit message or a visit guidance message, and delivers the HVC and the hold visit message or the visit guidance message simultaneously to the plurality of vehicles 12 within the delivery area. As a result, the burden posed on the broadcasting apparatus 17 when delivering information to a plurality of vehicles 12 within the delivery area is reduced, and the hold visit message or the visit guidance message can reliably be delivered to the vehicles 12.

The visit guidance message refers to information to be delivered to the vehicle 12, via the wireless link 14 through the public circuit network 16, wherein the information includes various guidance information items, including campaign information and maintenance information with respect to the vehicle 12. When various guidance information items for the occupant (driver) of the vehicle 12 are delivered as the visit guidance message to the vehicle 12, the vehicle 12, and the occupant thereof, can be prevented from coming unnecessarily to the repair shop 26. If the visit guidance message is delivered in this manner, instead of in written form, then since a written guidance notification is not required, the costs required to send the guidance information are reduced.

According to the present embodiment, as described above with respect to the fourth embodiment (see FIGS. 1 through 8), the vehicle 12 transmits an HVC (first code) and a DTC to the server 18, whereupon the server 18 uses the received HVC (first code) as an HVC for information delivery, adds a hold visit message to the HVC, and delivers the hold visit message and the HVC to the vehicle 12, or alternatively, generates an HVC (second code) and a visit guidance message based on the DTC, adds the visit guidance message to the HVC, and delivers the visit guidance message and the HVC to the vehicle 12. In this case, since the server 18 delivers information based on the HVC received from the vehicle 12, it is possible to deliver the hold visit message or the visit guidance message reliably to the vehicle 12, which has transmitted the HVC, so that the hold visit message or the visit guidance message can be output to the output unit 50.

In the fourth embodiment, the comparing means 44 can generate an HVC (first code) and transmit the generated HVC and the DTC to the server 18. As a consequence, it is possible to deliver information corresponding to the HVC without fail to vehicles 12 that suffer from device failures.

In the first through fourth embodiments, a device failure of a motor-driven door mirror 62, and a device failure of an air conditioner temperature sensor, have been described. However, the principles of the present invention are also applicable to device failures of a drive system device on the vehicle 12, or to device failures of any of other accessories on the vehicle 12.

Processes for guiding the vehicle 12 and the occupant of the vehicle 12 that suffers from a device failure, as well as for holding the visit of the vehicle 12 and occupant thereof to the repair shop 26, have been described above. The DTC, the hold visit message, and the HVC, which are stored in the message tables shown in FIGS. 3A, 3B, 4B, and the DTC and the HVC, which are stored in the reference table shown in FIG. 4A, can be updated by means of deliveries made as a broadcast from the broadcasting means 20, or made from the server 18 via the wireless link 14 through the public circuit network 16.

Specifically, the code/message generating means 56 adds a DTC, a hold visit message, and an HVC for updating the message table, or a DTC and an HVC for updating the reference table, to a code or to an HVC. The code/message generating means 56 further delivers such updating data in the form of a broadcast from the broadcasting means 20 to the vehicle 12 via radio waves 24, or delivers such updating data from the server 18 to the vehicle 12, via a wireless link 14 through a public circuit network 16. Based on comparison of such updating data with the code or the HVC in the comparing means 44, the data in the message table and the data in the reference table in the storage means 46 are updated by the received updating data.

Although, in the illustrated embodiments, the broadcasting means 20, which includes the broadcasting unit 28, delivers a code and an HVC, or an HVC and a visit guidance message, via a broadcast, it is also possible to deliver such data according to other delivery processes, such as a terrestrial digital broadcasting process.

Although certain preferred embodiments of the present invention have been shown and described in detail, it should be understood that various changes and modifications may be made therein without departing from the scope of the appended claims.

What is claimed is:

1. An information delivery system comprising:

a broadcasting apparatus for broadcasting an identification code and related information; and a vehicle for acquiring information delivered by a broadcast from said broadcasting apparatus;

said vehicle comprising:

an identification code storage unit for storing a first identification code;

a second identification code acquiring unit for acquiring a second identification code and first related information delivered by a broadcast from said broadcasting apparatus;

an identification code comparator for comparing said first identification code and said second identification code with each other; and an information output unit for outputting said first related information if said first identification code and said second identification code, which are compared with each other by said identification code comparator, agree with each other.

2. An information delivery system according to claim 1, wherein said information output unit deletes the first identification code stored in said identification code storage unit if said first identification code and said second identification code which are compared with each other by said identification code comparator, agree with each other.

3. An information delivery system according to claim 1, wherein said vehicle further comprises:

a first identification code acquiring unit for acquiring said first identification code and storing the acquired first identification code in said identification code storage unit.

4. An information delivery system according to claim 3, wherein said first identification code acquiring unit acquires said first identification code, which is delivered by a broadcast from said broadcasting apparatus.

5. An information delivery system according to claim 3, wherein said vehicle further comprises:

an identification code input unit for entering said first identification code, wherein said first identification code acquiring unit acquires said first identification code entered by said identification code input unit.

6. An information delivery system according to claim 3, wherein said vehicle further comprises:

a device failure detecting unit for detecting a device failure of said vehicle and outputting device failure information; and a failure information transmitting unit for transmitting said device failure information to said broadcasting apparatus;

wherein said broadcasting apparatus comprises:

a failure information receiver for receiving said device failure information transmitted from said failure information transmitting unit; and an identification code transmitting unit for transmitting said first identification code, corresponding to said device failure information received by said failure information receiver, to said vehicle, wherein said first identification code acquiring unit acquires said first identification code transmitted from said identification code transmitting unit.

7. An information delivery system according to claim 3, wherein said vehicle further comprises:

a device failure detecting unit for detecting a device failure of said vehicle and outputting device failure information; and a first identification code generating unit for generating said first identification code when said device failure information is output from said device failure detecting unit, wherein said first identification code acquiring unit stores said first identification code generated by said first identification code generating unit in said identification code storage unit.

8. An information delivery system according to claim 3, wherein said first identification code acquiring unit acquires both said first identification code and said second related information; and said information output unit outputs the acquired second related information when the acquired first identification code is stored in said identification code storage unit.

9. An information delivery system according to claim 8, wherein said second related information comprises a hold visit message, for holding a visit of said vehicle to a repair shop.

10. An information delivery system according to claim 1, wherein said first related information comprises a visit guidance message, for guiding a visit of said vehicle to a repair shop.

11. A vehicle comprising:

an identification code storage unit for storing a first identification code;

a second identification code acquiring unit for acquiring a second identification code and first related information delivered by a broadcast;

an identification code comparator for comparing said first identification code and said second identification code with each other; and an information output unit for outputting said first related information if said first identification code and said second identification code, which are compared with each other by said identification code comparator, agree with each other.

12. A vehicle according to claim 11, wherein said information output unit deletes said first identification code stored in said identification code storage unit if said first identification code and said second identification code, which are compared with each other by said identification code comparator, agree with each other.

13. A vehicle according to claim 11, further comprising:

a first identification code acquiring unit for acquiring said first identification code and storing the acquired first identification code in said identification code storage unit.

14. A vehicle according to claim 13, wherein said first identification code acquiring unit acquires said first identification code, which is delivered by a broadcast.

15. A vehicle according to claim 13, further comprising:

an identification code input unit for entering said first identification code, wherein said first identification code acquiring unit acquires said first identification code entered by said identification code input unit.

16. A vehicle according to claim 13, wherein said first identification code acquiring unit acquires both said first identification code and said second related information; and said information output unit outputs the acquired second related information when the acquired first identification code is stored in said identification code storage unit.

17. A vehicle according to claim 16, wherein said second related information comprises a hold visit message, for holding a visit of said vehicle to a repair shop.

18. A vehicle according to claim 11, wherein said first related information comprises a visit guidance message, for guiding a visit of said vehicle to a repair shop.

19. A method of outputting related information comprising the steps of:

storing a first identification code in an identification code storage unit of a vehicle;

acquiring a second identification code and first related information delivered by a broadcast, with a second identification code acquiring unit of said vehicle;

comparing said first identification code and said second identification code with each other, using an identification code comparator; and outputting said first related information from an information output unit, if said first identification code and said second identification code, which are compared with each other by said identification code comparator, agree with each other.

* * * * *